US012096385B2

(12) United States Patent
Wang et al.

(10) Patent No.: US 12,096,385 B2
(45) Date of Patent: Sep. 17, 2024

(54) METHOD FOR INFORMATION CONFIGURATION, TERMINAL, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventors: Shukun Wang, Guangdong (CN); Weijie Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 435 days.

(21) Appl. No.: 17/461,662

(22) Filed: Aug. 30, 2021

(65) Prior Publication Data

US 2021/0392595 A1 Dec. 16, 2021

Related U.S. Application Data

(63) Continuation of application No. PCT/CN2019/098445, filed on Jul. 30, 2019.

(51) Int. Cl.
*H04W 56/00* (2009.01)
*H04W 24/10* (2009.01)
(Continued)

(52) U.S. Cl.
CPC ......... *H04W 56/001* (2013.01); *H04W 24/10* (2013.01); *H04W 36/0061* (2013.01); *H04W 36/08* (2013.01)

(58) Field of Classification Search
None
See application file for complete search history.

(56) References Cited

U.S. PATENT DOCUMENTS

2018/0368088 A1* 12/2018 Nagaraja ........... H04W 72/0446
2019/0045559 A1 2/2019 Huang et al.
(Continued)

FOREIGN PATENT DOCUMENTS

CN 109075940 A 12/2018
CN 109587711 A 4/2019
(Continued)

OTHER PUBLICATIONS

Second Office Action of the European application No. 19939812.4, issued on May 8, 2023. 5 pages.
(Continued)

*Primary Examiner* — Alex Skripnikov
*Assistant Examiner* — Pamit Kaur
(74) *Attorney, Agent, or Firm* — Perkins Coie LLP

(57) ABSTRACT

A method for information configuration includes that: a terminal receives first configuration information, where the first configuration information is used for determining a measurement frequency list configuration, the measurement frequency list configuration includes measurement configuration of at least one first frequency layer corresponding to an asynchronous synchronization signal/physical broadcast channel block (SSB); and where the measurement configuration of the at least one first frequency layer carries first indication information, the first indication information is used by the terminal to determine a SSB measurement timing configuration (SMTC) configuration used for performing measurement at a frequency layer where the asynchronous SSB is located. The terminal and a non-transitory computer-readable storage medium are also provided.

13 Claims, 14 Drawing Sheets

100
110
120
120

(51) Int. Cl.
*H04W 36/00* (2009.01)
*H04W 36/08* (2009.01)

(56) References Cited

U.S. PATENT DOCUMENTS

| | | | | |
|---|---|---|---|---|
| 2019/0053235 | A1 | 2/2019 | Novlan et al. | |
| 2020/0252822 | A1 * | 8/2020 | Kim | H04W 76/15 |
| 2020/0344707 | A1 | 10/2020 | Nagaraja et al. | |
| 2021/0367741 | A1 | 11/2021 | Yiu et al. | |

FOREIGN PATENT DOCUMENTS

| | | | | | |
|---|---|---|---|---|---|
| CN | 109600770 | A | | 4/2019 | |
| CN | 109699067 | A | | 4/2019 | |
| CN | 109792660 | A | | 5/2019 | |
| CN | 112913301 | A | * | 6/2021 | H04W 24/08 |
| WO | 2019033058 | A1 | | 2/2019 | |
| WO | WO-2020192333 | A1 | * | 10/2020 | H04W 24/02 |

OTHER PUBLICATIONS

Nokia et al, "Discussion on measurement gap for NR", 3GPP TSG-RAN WG4 Meeting NR Adhoc#3 R4-1709712, Nagoya, Japan, Sep. 18-21, 2017. 5 pages.

Supplementary European Search Report in the European application No. 19939812.4, mailed on Feb. 16, 2022. 11 pages.

Written Opinion of the International Search Authority in the international application No. PCT/CN2019/098445, mailed on Apr. 17, 2020. 9 pages with English translation.

First Office Action of the European application No. 19939812.4, issued on Nov. 18, 2022. 7 pages.

3GPP TS 38.300 V15.5.0 (Mar. 2019), 3rd Generation Partnership Project; Technical Specification Group Radio Access Network; NR; NR and NG-RAN Overall Description; Stage 2, (Release 15). 98 pages.

First Office Action of the Chinese application No. 202110576569.2, issued on Aug. 31, 2022. 14 pages with English translation.

Mediatek Inc. "Correction on SMTC Configuration in NR SCell Addition Procedure", 3GPP TSG-RAN WG2 Meeting #105, R2-1900910, Feb. 15, 2019 (Feb. 15, 2019), pp. 1-5.

International Search Report in the international application No. PCT/CN2019/098445, mailed on Apr. 17, 2020.

3GPP TS 38.300 V16.3.0 (Sep. 2020), 3rd Generation Partnership Project; Technical Specification Group Radio Access Network; NR; NR and NG-RAN Overall Description; Stage 2, (Release 16).

3GPP TS 38.331 V16.2.0 (Sep. 2020), 3rd Generation Partnership Project; Technical Specification Group Radio Access Network; NR; Radio Resource Control (RRC) protocol specification, (Release 16).

* cited by examiner

Figure 8:
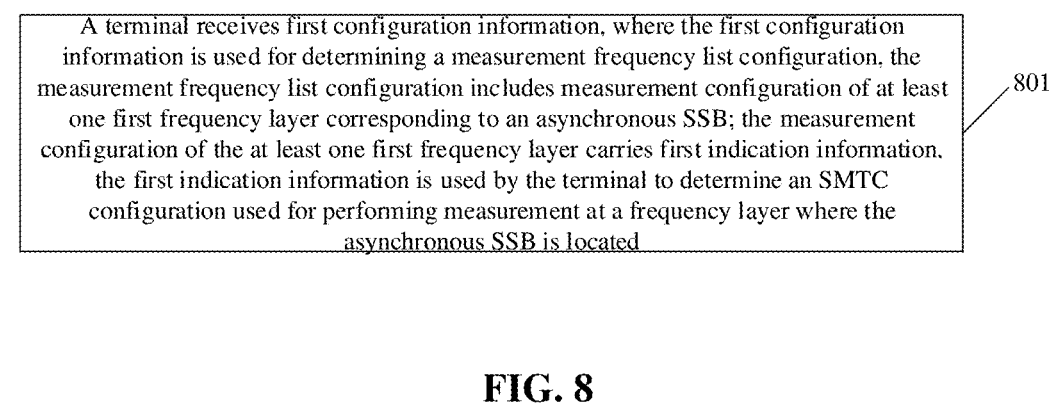

A terminal receives first configuration information, where the first configuration information is used for determining a measurement frequency list configuration, the measurement frequency list configuration includes measurement configuration of at least one first frequency layer corresponding to an asynchronous SSB; the measurement configuration of the at least one first frequency layer carries first indication information, the first indication information is used by the terminal to determine an SMTC configuration used for performing measurement at a frequency layer where the asynchronous SSB is located

METHOD FOR INFORMATION CONFIGURATION, TERMINAL, AND NON-TRANSITORY COMPUTER-READABLE STORAGE MEDIUM

CROSS-REFERENCE TO RELATED APPLICATION

This application is a U.S. continuation application of International Application No. PCT/CN2019/098445, entitled "INFORMATION CONFIGURATION METHOD AND APPARATUS, AND TERMINAL", filed on Jul. 30, 2019, the disclosure of which is hereby incorporated by reference in its entirety.

TECHNICAL FIELD

The disclosure relates to the technical field of mobile communications, and particularly to a method for information configuration, a terminal, and a non-transitory computer-readable storage medium.

BACKGROUND

A synchronization signal/physical broadcast channel (SS/PBCH) block (SSB) measurement timing configuration (SMTC) is configured per frequency. In general, the SMTC configuration is carried in a system broadcast message. However, an SMTC configuration corresponding to a frequency layer where an asynchronous SSB is located may not be carried in the system broadcast message.

SUMMARY

Embodiments of the disclosure provide a method for information configuration, a terminal, and a non-transitory computer-readable storage medium.

In a first aspect, a method for information configuration provided in the embodiments of the disclosure includes the following operations.

A terminal receives first configuration information. The first configuration information is used for determining a measurement frequency list configuration, the measurement frequency list configuration includes measurement configuration of at least one first frequency layer corresponding to an asynchronous SSB. And the measurement configuration of the at least one first frequency layer carries first indication information, the first indication information is used by the terminal to determine an SMTC configuration used for performing measurement at a frequency layer where the asynchronous SSB is located.

In a second aspect, a terminal provided in the embodiments of the disclosure includes a transceiver.

The transceiver is configured to receive first configuration information. The first configuration information is used for determining a measurement frequency list configuration, the measurement frequency list configuration includes measurement configuration of at least one first frequency layer corresponding to an asynchronous SSB. And the measurement configuration of the at least one first frequency layer carries first indication information, the first indication information is used by a terminal to determine an SMTC configuration used for performing measurement at a frequency layer where the asynchronous SSB is located.

In third aspect, a non-transitory computer-readable storage medium provided in the embodiments of the disclosure has stored therein a computer program. The computer program is executed by a computer to perform the above method for information configuration.

BRIEF DESCRIPTION OF THE DRAWINGS

The accompanying drawings, which are illustrated herein to provide a further understanding of the disclosure and constitute a part of this disclosure. The exemplary embodiments of the disclosure and their description are used to explain the disclosure and not to unduly limit the disclosure. In the drawings:

FIG. 8 is a schematic flowchart of a method for information configuration according to an embodiment of the disclosure.

DETAILED DESCRIPTION

A synchronization signal/physical broadcast channel (SS/PBCH) block (SSB) measurement timing configuration (SMTC) is configured per frequency. In general, the SMTC configuration is carried in a system broadcast message. However, an SMTC configuration corresponding to a frequency layer where an asynchronous SSB is located may not be carried in the system broadcast message. Therefore, how to obtain the SMTC configuration corresponding to the frequency layer where the asynchronous SSB is located is a problem to be solved in the related art.

Technical solutions in the embodiments of this disclosure will be described with reference to the accompanying drawings in the embodiments of the disclosure. Apparently, the described embodiments are some embodiments of the disclosure rather than all of the embodiments. All other embodiments obtained by a person of ordinary skill in the art based on the embodiments of the disclosure without creative efforts shall fall within the protection scope of the disclosure.

The technical solutions of the embodiments of the disclosure may be applied to various communications systems, such as: a Global System for Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS) system, a Worldwide Interoperability for Microwave Access (WiMAX) communication system, and a $5^{th}$ Generation Mobile Communication Technology (5G) system.

Figure 1:
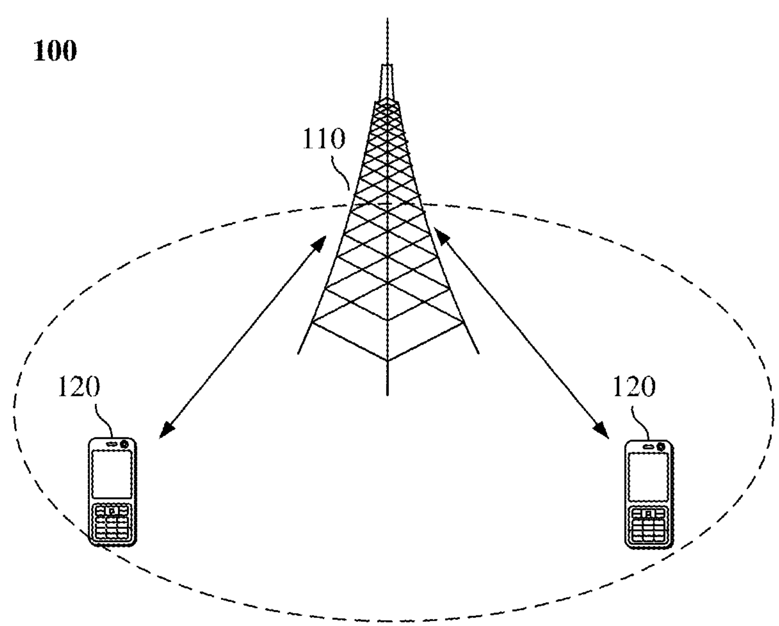
FIG. 1 is a schematic diagram of architecture of a communication system according to an embodiment of the disclosure.

As an example, FIG. 1 illustrates a communication system 100 to which the embodiments of the disclosure are applied. The communication system 100 may include a network device 110. The network device 110 may be a device that communicates with a terminal 120 (also called as a communication terminal or a terminal). The network device 110 may provide communication coverage for a particular geographic area, and may communicate with a terminal located within the coverage area. Optionally, the network device 110 may be a base transceiver station (BTS) in a GSM system or CDMA system, a NodeB (NB) in a WCDMA system, an evolved NodeB (eNB or eNodeB) in an LTE system, or a wireless controller in a cloud radio access network (CRAN). Or the network device may be a mobile switching center, a relay station, an access point, an in-vehicle device, a wearable device, a hub, a switch, a network bridge, a router, a network side device in a 5G network, a network device in a future evolved public land mobile network (PLMN) or the like.

The wireless communication system 100 further includes at least one terminal 120 located within the coverage of the network device 110. The "terminal" used herein includes, but is not limited to, a device configured to receive/send a communication signal through a wired line connection, such as through a public switched telephone network (PSTN), a digital subscriber line (DSL), a digital cable, a directness cable and/or another data connection/network; and/or through a wireless interface, such as for a cellular network, a wireless local area network (WLAN), a digital television network like a Digital Video Broadcasting-Handheld (DVB-H) network, a satellite network, and an Amplitude Modulated (AM)-Frequency Modulated (FM) broadcasting transmitter; and/or another terminal; and/or a device of Internet of things (IoT) device. The terminal which is configured to communicate through a wireless interface may be called as a "wireless communication terminal", a "wireless terminal" or a "mobile terminal". Examples of a mobile terminal include but are not limited to: a satellite telephone or a cellular telephone; a personal communication system (PCS) terminal that is capable of combining capabilities of cellular radio telephones, data process, faxes and data communication; a PDA that may include a cellular radiotelephone, a pager, an Internet/Intranet access, a Web browser, an organizer, a calendar and/or a global positioning system (GPS) receiver; and a conventional laptop and/or palmtop receiver or another electronic device that includes a radiotelephone transceiver. The terminal may be an access terminal, user equipment (UE), a subscriber unit, a subscriber station, a mobile station, a mobile console, a remote station, a remote terminal, a mobile device, a user terminal, a terminal, a wireless communication device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal in a 5G network, a terminal in a future evolved PLMN or the like.

Optionally, the terminals 120 may perform a device to device (D2D) communication with each other.

Optionally, the 5G system or network may be further referred to as a new radio (NR) system or network.

FIG. 1 exemplarily illustrates one network device and two terminals. Optionally, the communication system 100 may include multiple network devices and a coverage of each network device may include another number of terminals. There are no limits made thereto in the embodiments of the present disclosure.

Optionally, the communication system 100 may further include other network entities such as a network controller and a mobility management entity. This is not limited in this embodiment of the disclosure.

It should be understood that, a device in the network/system of embodiments of the disclosure having a communication function may be referred to as a communication device. Taking the communication system 100 illustrated in FIG. 1 as an example, a communication device may include a network device 110 and a terminal 120 having communication functions. The network device 110 and the terminal 120 may be specific devices described above, details are not described herein again. The communication device may further include other devices in the communication system 100, such as a network controller, a mobility management entity or the like. This is not limited in this embodiment of the disclosure.

It should be understood that, terms "system" and "network" in the disclosure are usually interchangeably used. The term "and/or" in the disclosure is only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

For convenience of understanding the technical solutions of the embodiments of the disclosure, related technologies involved in embodiments of the disclosure are described.

For convenience of understanding the technical solutions of the embodiments of the disclosure, related technologies in embodiments of the disclosure are described. Any combination of the following related technologies and technical solutions of the embodiments of the disclosure belongs to the scope of the embodiments of the disclosure.

Due to people's demand on speed, latency, high-speed mobility, energy efficiency, as well as the diversity and complexity of service in future life, the $3^{rd}$ Generation Partnership Project (3GPP) international standards organization has begun to develop 5G. The main application scenarios of 5G include: enhanced Mobile BroadBand (eMBB), Ultra-Reliable Low-Latency Communications (URLLC) and massive Machine-Type Communications (mMTC).

On the one hand, the eMBB still aims at providing users with multimedia content, services and data, and its demand is growing very rapidly. On the other hand, the eMBB may be deployed in different scenarios such as indoor, urban, rural, etc., and the capabilities and requirements of these scenarios vary greatly. Therefore, it is necessary to make detailed analysis combined with specific scenarios and may not be unconditionally defined. Typical applications of the URLLC includes: industrial automation, power automation, remote medical operation (surgery), traffic safeguard, etc. Typical characteristics of the mMTC includes: high connection density, small data amount, delay-insensitive services, low cost and long service life of modules and so on.

NR may also be deployed independently. For the purpose of reducing air interface signaling, quickly resuming wireless connections, and quickly resuming data services, 5G defines a new radio resource control (RRC) state, i.e., RRC_INACTIVE state. The RRC_INACTIVE state is different from an RRC_IDLE state and RRC ACTIVE state.

Herein, 1) RRC_IDLE state (called as idle state for short): mobility is based on cell selection and reselection of UE; paging is initiated by a Core Network (CN); and a paging area is configured by the CN. There is no UE context and no RRC connection on the base station side.

2) RRC_CONNECTED state (called as connected state for short): there is an RRC connection; and the UE context is preserved in the base station side and UE side. The network side knows that the UE location is at a specific cell level. The mobility is controlled by the network side. Unicast data may be transmitted between the UE and the base station.

3) RRC_INACTIVE state (called as inactive state for short): mobility is based on cell selection and reselection of UE; there is a connection between Core Network (CN) and NR; UE context is preserved in a certain base station; paging is triggered by a radio access network (RAN); an RAN-based paging area is managed by the RAN; the network side knows that the UE location is at a level of RAN-based paging area.

Figure 2:
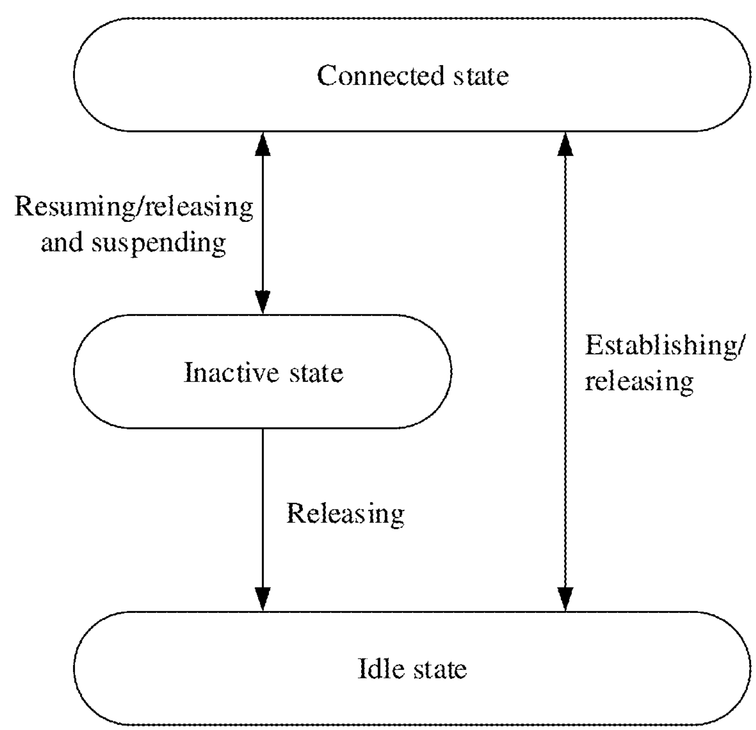
FIG. 2 is a schematic diagram of an Radio Resource Control (RRC) state transition according to an embodiment of the disclosure.

The network side may control an RRC state transition of UE, as illustrated in FIG. 2, specifically:

1) RRC_CONNECTED state and RRC_INACTIVE state

On the one hand, the network side may control the UE to switch from the RRC_CONNECTED state to the RRC_INACTIVE state by releasing and suspending the RRC connection.

On the other hand, the network side may control the UE to switch from the RRC_INACTIVE state to the RRC_CONNECTED state by resuming the RRC connection.

2) RRC_CONNECTED state and RRC_IDLE state

On the one hand, the network side may control the UE to switch from the RRC_CONNECTED state to the RRC_IDLE state by releasing the RRC connection.

On the other hand, the network side may control the UE to switch from the RRC_IDLE state to the RRC_CONNECTED state by establishing the RRC connection.

3) RRC_INACTIVE state and RRC_IDLE state

The network side may control the UE to switch from the RRC_INACTIVE state to the RRC_IDLE state by releasing the RRC connection.

When the UE is in the RRC_INACTIVE state, any of the events described as following may trigger the UE to return to the RRC_IDLE state autonomously:

- an initial paging message is received from CN;
- a timer T319 is started when an RRC resuming request is initiated, and the timer T319 expires;
- MSG4 integrity protection and verification is failed;
- another radio access technology (RAT) is reselected when cell reselection;
- a camp on any cell state is entered.

The UE in the RRC_INACTIVE state has the following characteristics:

- the connection with the RAN and the CN is maintained;
- the UE and at least one base station preserve access stratum (AS) context;
- the UE is reachable for the RAN side, and related parameters are configured by the RAN;
- it is unnecessary for the UE to notify the network side when the UE moves within the RNA configured by the RAN, but it is necessary to notify the network side when the UE moves out of the RNA;
- the UE moves within the RNA according to a way of cell selection and reselection.

Figure 3:
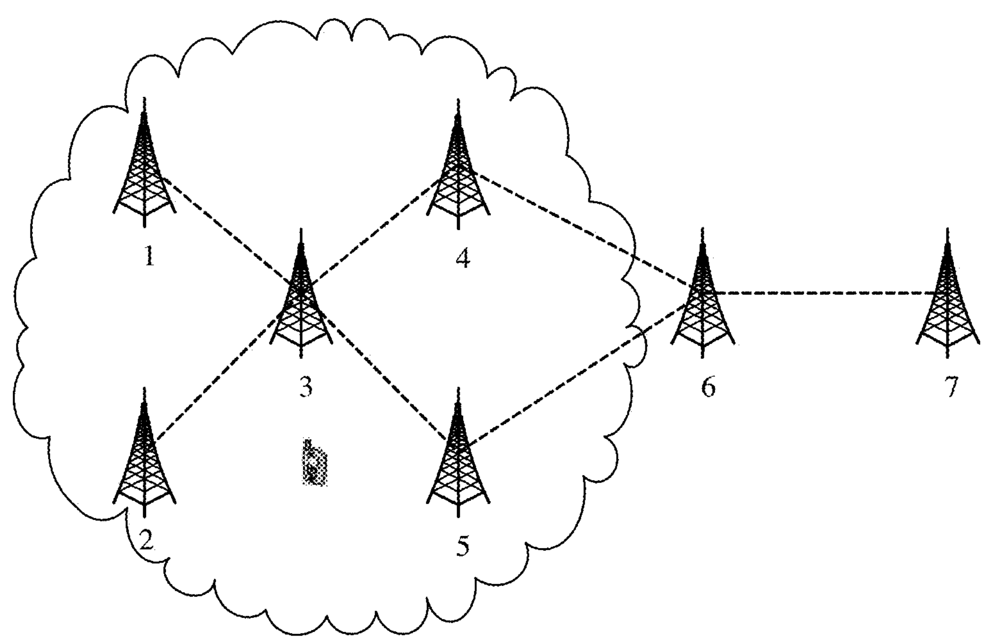
FIG. 3 is a schematic diagram of an Radio Access Network (RAN) Notification Area (RNA) with UE in an RRC_INACTIVE state according to an embodiment of the disclosure.

FIG. 3 is a schematic diagram of an RNA with UE in an inactive state. A cell range covered by the base station 1 to the base station 5 is the RNA. When the UE moves within the RNA, it is unnecessary to notify the network side, and the mobility behavior in the idle state, i.e., the principle of cell selection and reselection, is followed. When the UE moves out of the paging area configured by the RAN, the UE may be triggered to resume the RRC connection and reacquire a paging area configured by the RAN. When downlink data is arriving at the UE, the gNB which maintains the connection between the RAN and the CN for the UE may trigger all the cells in the RAN paging area to send paging messages to the UE, such that the UE in the inactive state may resume the RRC connection and receive data. The UE in the inactive state is configured with the RAN paging area, and it is necessary for the UE to update location periodically according to a period configured by the network, to ensure the reachability of the UE in the paging area.

Therefore, there are three cases when the UE enters into the connected state from the inactive state:

- case 1: when downlink data is arriving at the UE, the network side initiates an initial RAN paging to prompt the UE to enter into the connected state;
- case 2: the UE initiates an update of RAN location area by itself, for example, a periodic update of RAN location or a cross-area location update;
- case 3: the UE has a requirement of sending uplink data, which prompts the UE to enter into the connected state.

Figure 4A:
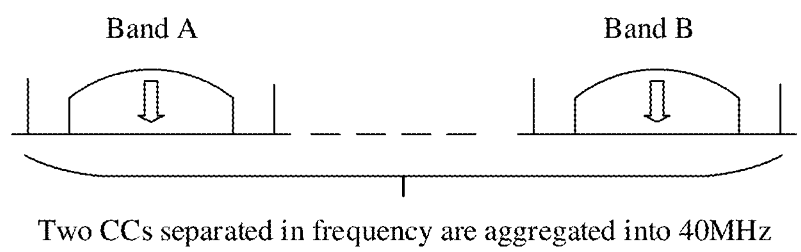
FIG. 4A is a schematic diagram of a non-continuous carrier aggregation according to an embodiment of the disclosure.
Figure 4B:
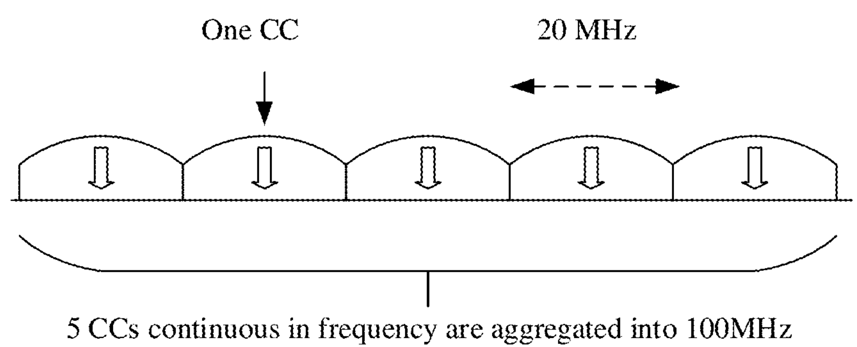
FIG. 4B is a schematic diagram of a continuous carrier aggregation according to an embodiment of the disclosure.

To meet the high-speed requirement, 5G also supports carrier aggregation (CA) technology. The carrier aggregation jointly schedules and uses resources on multiple component carriers (CC), such that the NR system may support a larger bandwidth, and a higher system peak rate is therefore reached. The carrier aggregation may be divided into a continuous carrier aggregation and a non-continuous carrier aggregation according to the continuity of the carriers to be aggregated on a spectrum. FIG. 4A is a schematic diagram of a non-continuous carrier aggregation, and FIG. 4B is a schematic diagram of a continuous carrier aggregation. The carrier aggregation may also be divided into an intra-band carrier aggregation and an inter-band carrier aggregation according to whether the carriers to be aggregated are in the same frequency band.

There is one and only one primary cell component (PCC) in the CA, the PCC provides an RRC signaling connection, non-access stratum (NAS) function, security, etc. A physical uplink control channel (PUCCH) exists and only exists in the PCC. There may be one or more secondary cell components (SCCs) in the CA, and the SCC only provides an additional radio resources. The PCC and the SCC are both called serving cells. Among them, a cell of the PCC is a primary cell (Pcell), and a cell of the SCC is a secondary cell (Scell). The standard also specifies that the aggregation of maximum 5 carriers is supported, that is to say, the maximum bandwidth after aggregation is 100 MHZ, and moreover, the carriers to be aggregated belong to the same base station. All the carriers to be aggregated use the same cell-radio network temporary identifier (C-RNTI), and the implementation of the base station ensures that the C-RNTI does not conflict in the cell where each carrier is located. Since both asymmetric carrier aggregation and symmetric carrier aggregation are supported, the carriers to be aggregated must have a downlink carrier, but may not have an uplink carrier. Moreover, the primary carrier cell must has the physical downlink control channel (PDCCH) and PUCCH of the present cell, and only the primary carrier cell has the PUCCH, secondary carrier cells may have the PDCCH.

Therefore, LTE Release 15 (LTE R15) has optimized the CA, and the main optimization functions are as follows:

UE measurements during idle mode: a measurement configuration (i.e., a dedicated measurement configuration) of the idle state may be configured in an RRC release message (i.e., RRC dedicated signaling), or may also be configured in a system broadcast SIB5. The UE may use the dedicated measurement configuration if it has the dedicated measurement configuration; otherwise, the UE may use the measurement configuration in SIB5. Herein, there is no limit of a valid duration of the measurement configuration in SIB5. However, a valid duration of the dedicated measurement configuration, i.e., T331 (i.e., measIdleDuration) may be configured while the dedicated measurement configuration is configured in the RRC dedicated signaling. When T331 expires or stops, the measurement configuration configured in the dedicated signaling is released. Whether the UE continues to use the measurement configuration in SIB5 depends on the implementation of the UE.

The UE performs measurement after obtaining the measurement configuration of the idle state (called as idle measurement configuration for short). The UE indicates that there is a measurement result of the idle state (called as idle measurement result for short) in the uplink message sent to the network side, and then reports the measurement result based on a request from the base station. Meanwhile, the cell may also broadcast whether the reporting of the idle measurement result is supported in SIB2.

Figure 5:
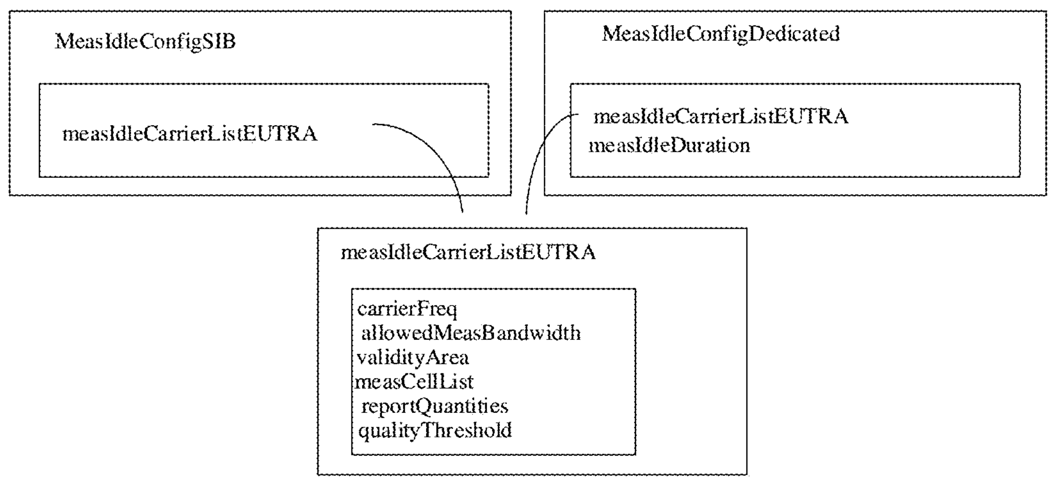
FIG. 5 is a schematic diagram of an idle measurement configuration according to an embodiment of the disclosure.

FIG. 5 illustrates the idle measurement configuration. The idle measurement configuration (MeasIdleConfigSIB) in the system broadcast SIB5 includes a carrier list (measIdleCarrierListEUTRA). The idle measurement configuration (MeasIdleConfigDedicated) in the RRC dedicated signaling includes a carrier list (measIdleCarrierListEUTRA) and a valid duration (measIdleDuration). Further, measIdleCarrierListEUTRA includes carrierFreq, allowedMeasBandwidth, validityArea, reportQuantities and qualityThreshold. Among them, carrierFreq and allowedMeasBandwidth indicate a measurement frequency and a measurement bandwidth, respectively; validityArea indicates a valid area of the idle measurement configuration, in which the valid area is a cell list. If the UE reselctes to a cell outside the validityArea, the timer T331 stops. A cell where the measurement configuration is reported is given in measCellList, and other cells do not needed to be reported. If measCellList is not configured, the UE reports a measurement report of maxCellMeasIdle cells which meet the qualityThreshold. The measurement to be reported is specified by reportQuantities.

In the early deployment of NR, it is difficult to obtain an entire NR coverage; therefore, the typical network coverage is a wide-area LTE coverage mode and an NR island coverage mode. Moreover, a large amount of LTE deployments are below 6 GHz, and there are few spectrums below 6 GHz that can be used by 5G. Therefore, it is necessary for the NR to research the application of the spectrum above 6 GHz, however, the high frequency band has limited coverage and fast signal fading. Meanwhile, in order to protect the early investment of mobile operators in LTE, an operation mode of tight interworking between LTE and NR is proposed.

Figure 6:
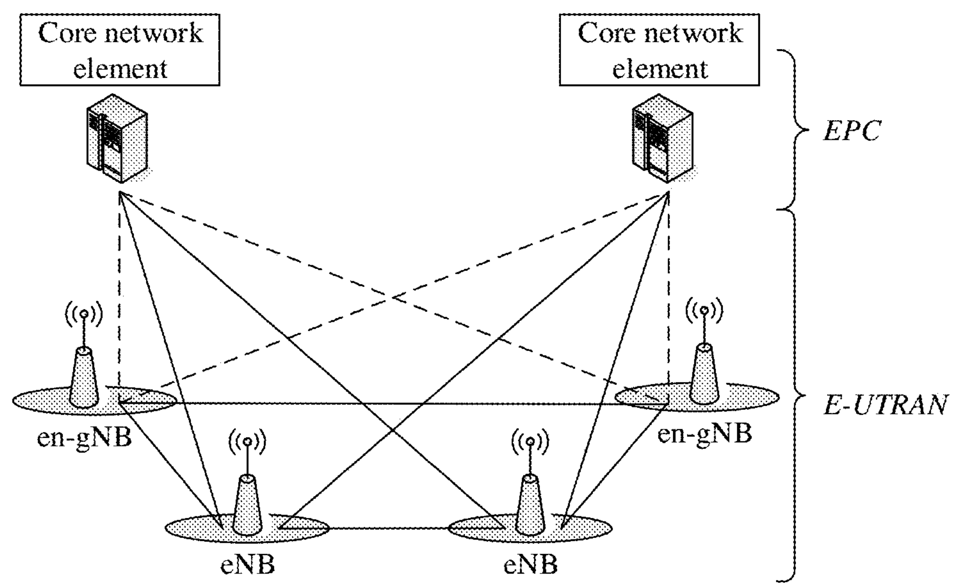
FIG. 6 is a schematic diagram of a network deployment and networking architecture of an Evolved Universal Terrestrial Radio Access (E-UTRA)-New Radio Access (NR) Dual Connectivity (EN-DC) according to an embodiment of the disclosure.

In order to achieve a 5G network deployment and commercial applications as soon as possible, 3GPP has completed the first version of 5G firstly, i.e., EN-DC (LTE-NR Dual Connectivity), before the end of December 2017. It the EN-DC, the base station of LTE (i.e., eNB) serves as a master node (MN), and the base station of NR (i.e., gNB or en-gNB) serves as a secondary node (i.e., SN). The network deployment and networking architecture of the EN-DC is illustrated in FIG. 6. In this figure, an evolved universal terrestrial radio access network (E-UTRAN) represents an access network, an evolved packet core network (EPC) represents a core network. The access network includes at least one eNB (there are two eNBs shown in the FIG. 6) and at least one en-gNB (there are two en-gNBs shown in the FIG. 6), where eNB serves as the MN and en-gNB serves as the SN, and the MN and SN are both connected to the EPC. In the later stage of R15, other DC modes may be supported, such as NE-DC, 5GC-EN-DC, and NR DC. For EN-DC, the core network connecting to the access network is EPC, while the connected core network in other DC modes is 5GC.

In R16, in order to configure the UE with CA and DC quickly, measurement performing and measurement result recording by the UE in the idle state or the inactive state based on the measurement configuration configured by the network side is introduced. After the UE enters into the connected state, the UE reports the measurement result to the network side to assist the network side to configure the CA and the DC.

In an Radio Resource Management (RRM) measurement, a measurement signal may be an SSB. A primary synchronization signal (PSS) in the measurement SSB or a demodulation reference signal (DMRS) of a physical broadcast channel (PBCH) is measured to obtain a beam measurement result and a cell measurement result. In addition, the UE in the connected state may also be configured with the CSI-RS as a reference signal of the cell measurement.

Figure 7:
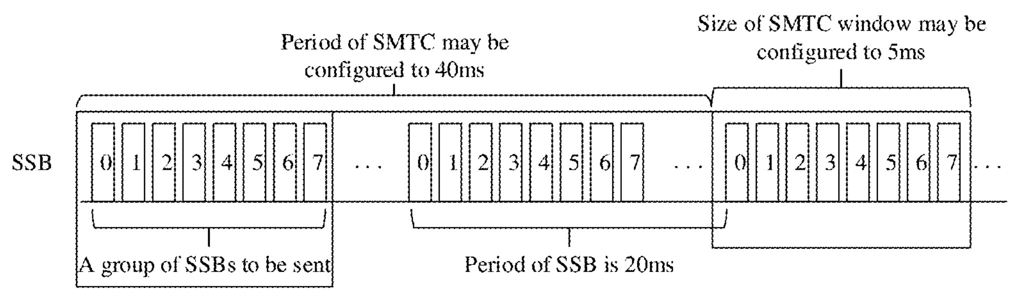
FIG. 7 is a schematic diagram of an SMTC according to an embodiment of the disclosure.

For an SSB-based measurement, the actual transmission position of the SSB in each cell may be different, and the period of an SS burst set may also be different. Therefore, in order to save the energy of the UE during the measurement process, the network side configures the UE with an SMTC, and the UE only needs to perform measurement in an SMTC window, as illustrated in FIG. 7.

Since the location of the actually transmitted SSB in each cell may be different, in order to allow the UE to find the location of the actually transmitted SSB as soon as possible, the network side may also configure the UE with the actual SSB transmission location for the UE measurement, such as a union of the actual SSB transmission positions of all the measurement cells, as shown in Table 1 below.

TABLE 1

```
SSB-ToMeasure ::=          CHOICE {
    shortBitmap                BIT STRING (SIZE (4)),
    mediumBitmap                   BIT STRING (SIZE (8)),
    longBitmap                 BIT STRING (SIZE (64))
}
```

The measurement configuration of the idle state and the inactive state is configured through the system broadcast from the network. The configuration information is configured per cell, such as a list of inter-frequency carrier frequencies to be measured, as shown in Table 2.

TABLE 2

```
SIB4 ::=            SEQUENCE {
      interFreqCarrierFreqList                InterFreqCarrierFreqList,
      lateNonCriticalExtension                OCTET STRING          OPTIONAL,
      ...
}
InterFreqCarrierFreqList    ::=                           SEQUENCE    (SIZE (1..maxFreq))    OF
InterFreqCarrierFreqInfo
InterFreqCarrierFreqInfo ::=            SEQUENCE {
      dl-CarrierFreq                          ARFCN-ValueNR,
      frequencyBandList                                         MultiFrequencyBandListNR-SIB
OPTIONAL,    -- Need R
      frequencyBandListSUL                                      MultiFrequencyBandListNR-SIB
OPTIONAL,    -- Need R
      nrofSS-BlocksToAverage                      INTEGER (2..maxNrofSS-BlocksToAverage)
OPTIONAL,
      absThreshSS-BlocksConsolidation                                         ThresholdNR
OPTIONAL,
      smtc                                                                        SSB-MTC
OPTIONAL,    -- Need R
      ssbSubcarrierSpacing                    SubcarrierSpacing,
      ssb-ToMeasure                                                         SSB-ToMeasure
OPTIONAL,    -- Need R
      deriveSSB-IndexFromCell                 BOOLEAN,
      ss-RSSI-Measurement                                           SS-RSSI-Measurement
OPTIONAL,
      q-RxLevMin                              Q-RxLevMin,
      q-RxLevMinSUL                           Q-RxLevMin            OPTIONAL,              -- Need
R
      q-QualMin                               Q-QualMin             OPTIONAL,              -- Need
R,
      p-Max                                   P-Max                                   OPTIONAL,
-- Need R
      t-ReselectionNR                         T-Reselection,
      t-ReselectionNR-SF                      SpeedStateScaleFactors OPTIONAL,                   --
Need N
      threshX-HighP                           ReselectionThreshold,
      threshX-LowP                            ReselectionThreshold,
      threshX-Q                               SEQUENCE {
            threshX-HighQ                             ReselectionThresholdQ,
            threshX-LowQ                              ReselectionThresholdQ
      }                                                                         OPTIONAL, --
Cond RSRQ
      cellReselectionPriority             CellReselectionPriority       OPTIONAL,                --
Need R
      cellReselectionSubPriority          CellReselectionSubPriority    OPTIONAL,                --
Need R
      q-OffsetFreq                            Q-OffsetRange                     DEFAULT dB0,
      interFreqNeighCellList              InterFreqNeighCellList        OPTIONAL,                --
Need R
      interFreqBlackCellList              InterFreqBlackCellList        OPTIONAL,                --
Need R
      ...
}
InterFreqNeighCellList ::=              SEQUENCE (SIZE (1..maxCellInter)) OF
InterFreqNeighCellInfo
InterFreqNeighCellInfo ::=              SEQUENCE {
      physCellId                                      PhysCellId,
      q-OffsetCell                                    Q-OffsetRange,
            q-RxLevMinOffsetCell                          INTEGER (1..8)            OPTIONAL,
-- Need R
            q-RxLevMinOffsetCellSUL                       INTEGER (1..8)            OPTIONAL,
-- Need R
      q-QualMinOffsetCell                                 INTEGER (1..8)            OPTIONAL,
-- Need R
      ...
}
InterFreqBlackCellList ::=            SEQUENCE (SIZE (1..maxCellBlack)) OF PCI-Range
```

It is agreed in the standard that the measurement configuration includes an NR frequency list and an LTE frequency list. The measurement configuration may be configured in the system broadcast or in the RRC release message. It is also agreed in the standard that reference information to be measured may be both of a synchronous SSB and an asynchronous SSB. Moreover, the measurement configuration may be effective in multiple cells, that is to say, after the cell reselection, the measurement indicated by the measurement configuration needs to be continued.

The SMTC is configured per frequency in SIB4, and timing reference of the SMTC is based on the present serving cell. When the UE obtains the measurement configuration from the present serving cell and the measurement configuration includes frequency information and the SMTC configuration corresponding to the frequency information, timing information of the SMTC configuration refers to timing information of the present serving cell. When the terminal reselects to another cell, since different cells have difference timing information, the SSB to be measured may not be found if the SMTC window is still determined according to the previous SMTC configuration. On the other hand, the frequency layer where the asynchronous SSB is located may not be included in the measurement configuration of SIB4, therefore, the SMTC used for performing measurement at the frequency layer where the asynchronous SSB is located has not be defined yet. For this reason, solutions of embodiments of the disclosure are provided as follows.

FIG. 8 is a schematic flowchart of a method for information configuration according to an embodiment of the disclosure. As illustrated in FIG. 8, the method for information configuration includes the following operations.

At 801: a terminal receives first configuration information. The first configuration information is used for determining a measurement frequency list configuration, the measurement frequency list configuration includes measurement configuration of at least one first frequency layer corresponding to an asynchronous SSB. And the measurement configuration of the first frequency layer carries first indication information, the first indication information is used by the terminal to determine an SMTC configuration used for performing measurement at a frequency layer where the asynchronous SSB is located.

In an optional implementation of the disclosure, the first configuration information is carried in a system broadcast message or RRC dedicated signaling. The RRC dedicated signaling is, for example, an RRC release message.

In an embodiment of the disclosure, the first configuration information is used for measurement of the terminal in a connected state and/or an inactive state, and a measurement result corresponding to the first configuration information is used for the network to configure a carrier aggregation and/or a dual connection. It would be understood that the first configuration information may also be called as measurement configuration information in a connected state and/or an inactive state.

In a specific implementation, after obtaining the first configuration information, the terminal performs measurement according to the first configuration information in the idle state and/or the inactive state, and reports the measurement result to the network after entering into the connected state, thereby assisting the network to configure the carrier aggregation and/or the dual connection.

In an embodiment of the disclosure, the first configuration information is used for determining the measurement frequency list configuration. In an optional implementation, the measurement frequency list configuration includes at least an NR measurement frequency list configuration. Further, the measurement frequency list configuration at least may also include an E-UTRAN measurement frequency list configuration.

In an embodiment of the disclosure, the measurement frequency list configuration includes the measurement configuration of at least one first frequency layer, and/or the measurement configuration of at least one second frequency layer. The first frequency layer corresponds to the asynchronous SSB and the second frequency layer corresponds to the synchronous SSB. It should be noted that the first frequency layer corresponding to the asynchronous SSB refers to the center frequency of the first frequency layer being located in the frequency layer where the asynchronous SSB is located; and the second frequency layer corresponding to the synchronous SSB refers to the center frequency of the second frequency layer being located in the frequency layer where the synchronous SSB is located. Herein, the frequency layer refers to a frequency range in the frequency domain. Ways of determining the SMTC configuration of the first frequency layer and the second frequency layer are respectively described in the following.

The measurement frequency list configuration includes the measurement configuration of at least one first frequency layer corresponding to the asynchronous SSB.

For example, the NR measurement frequency list configuration includes the measurement configuration of at least one first frequency layer, and the first frequency layer corresponds to the asynchronous SSB.

In this embodiment, the measurement configuration of the first frequency layer carries first indication information, the first indication information is used by the terminal to determine the SMTC configuration used for performing measurement at the frequency layer where the asynchronous SSB is located. In an optional implementation, the SMTC configuration may include period information, offset information and window duration information, as illustrated in Table 3. The terminal may determine a time domain location of the SMTC window according to the SMTC configuration and then perform measurement.

TABLE 3

```
SSB-MTC ::=                SEQUENCE {
  periodicityAndOffset       CHOICE {
    sf5                        INTEGER (0..4),
    sf10                         INTEGER (0..9),
    sf20                         INTEGER (0..19),
    sf40                         INTEGER (0..39),
    sf80                         INTEGER (0..79),
    sf160                        INTEGER (0..159)
  },
  duration                   ENUMERATED { sf1, sf2, sf3, sf4, sf5 }
}
```

In an embodiment of the disclosure, the operation of determining the SMTC configuration based on the first indication information may be implemented in the following manners.

Manner 1: the first indication information indicates first frequency information; the terminal determines a first SMTC configuration corresponding to the first frequency information from second configuration information of a first cell, and takes the first SMTC configuration as the SMTC configuration used for performing measurement at the frequency layer where the asynchronous SSB is located.

Herein, timing information of the first SMTC configuration is determined based on the timing information of the first cell.

Herein, the second configuration information is carried in the system broadcast message, and the second configuration information is used for determining a correspondence between at least one group of frequency information and the SMTC configuration.

For example, the terminal searches for the first frequency information in SIB4 of the present serving cell according to the first frequency information, obtains the first SMTC configuration corresponding to the first frequency information, and takes the first SMTC configuration as the SMTC configuration used for performing measurement at the frequency layer where the asynchronous SSB is located. Moreover, the timing information of the first SMTC configuration is determined based on the timing information of the present serving cell.

Further, in an optional implementation, when the terminal fails to search for the first SMTC configuration corresponding to the first frequency information from the second configuration information of the first cell, the terminal determines an SSB period corresponding to the first frequency layer based on a default configuration. For example, the default configuration may be used for determining the SSB period as 5 ms, 10 ms, etc.

In an embodiment of the disclosure, taking into consideration the fact that the terminal reselects the cell, the following two ways may be used for determining the SMTC configuration:

(1) when the terminal reselects from the first cell to a second cell, the terminal determines a second SMTC configuration corresponding to the first frequency information from second configuration information of the second cell, and takes the second SMTC configuration as the SMTC configuration used for performing measurement at the frequency layer where the asynchronous SSB is located. Further, timing information of the second SMTC configuration is determined based on timing information of the second cell. Further, when the terminal fails to search for the second SMTC configuration corresponding to the first frequency information from the second configuration information of the second cell, the terminal determines the SSB period corresponding to the first frequency layer based on the default configuration. For example, the default configuration may be used for determining the SSB period as 5 ms, 10 ms, etc.

For example, after the terminal reselects the cell, the terminal searches for the first frequency information in SIB4 of the present serving cell (the present serving cell is switched from the original first cell to the second cell) according to the first frequency information, obtains the first SMTC configuration corresponding to the first frequency information, and takes the first SMTC configuration as the SMTC configuration used for performing measurement at the frequency layer where the asynchronous SSB is located. Moreover, the timing information of the first SMTC configuration is determined based on the timing information of the present serving cell (the present serving cell is switched from the original first cell to the second cell).

(2) when the terminal reselects from the first cell to the second cell, the terminal determines a second SMTC configuration according to a timing deviation between the first cell and the second cell and the first SMTC configuration, and takes the second SMTC configuration as the SMTC configuration used for performing measurement at the frequency layer where the asynchronous SSB is located. Further, the timing information of the second SMTC configuration is determined based on the timing information of the second cell.

Specifically, the first SMTC configuration is used for determining a first SMTC window, and the second SMTC configuration is used for determining a second SMTC window. The time deviation between the first SMTC window and the second SMTC window is determined based on the timing deviation between the first cell and the second cell.

In a specific implementation, when the timing information of the second cell is earlier than the timing information of the first cell, the terminal moves the first SMTC window in an increase direction of time by the timing deviation to obtain the second SMTC window; or when the timing information of the second cell is later than the timing information of the first cell, the terminal moves the first SMTC window in a decrease direction of time by a timing deviation to obtain the second SMTC window.

It should be noted that the timing information of the second SMTC window is determined based on the timing information of the reselected cell (i.e., the second cell).

In the above solution, the timing deviation includes at least one of: M1 system frames, M2 subframes, M3 slots or M4 symbols, where M1, M2, M3 and M4 are positive integers.

Manner 2: the first indication information indicates the first frequency information and the first offset information. The terminal determines a reference SMTC configuration corresponding to the first frequency information from second configuration information of a first cell, determines the first SMTC configuration according to the first offset information and the reference SMTC configuration, and takes the first SMTC configuration as the SMTC configuration used for performing measurement at the frequency layer where the asynchronous SSB is located.

Herein, timing information of the first SMTC configuration is determined based on the timing information of the first cell.

Herein, the second configuration information is carried in the system broadcast message, and the second configuration information is used for determining a correspondence between at least one group of frequency information and the SMTC configuration.

For example, the terminal searches for the first frequency information in SIB4 of the present serving cell according to the first frequency information, and obtains the reference SMTC configuration corresponding to the first frequency information, and then determines the first SMTC configuration according to the reference SMTC configuration and the first offset information, and takes the first SMTC configuration as the SMTC configuration used for performing measurement at the frequency layer where the asynchronous SSB is located. Moreover, the timing information of the first SMTC configuration is determined based on the timing information of the present serving cell.

In the above solution, the operation that the terminal determines the first SMTC configuration according to the reference SMTC configuration and the first offset information may be implemented in the following two manners.

I) The reference SMTC configuration is used for determining a reference SMTC window, and the first SMTC configuration is used for determining the first SMTC window. The time deviation between the first SMTC window and the reference SMTC window is determined based on the first offset information. Specifically, the terminal moves the reference SMTC window in an increase direction of time by a time length corresponding to the first offset information to obtain the first SMTC window. Alternatively, the terminal moves the reference SMTC window in a decrease direction of time by a time length corresponding to the first offset information to obtain the first SMTC window.

For this manner, the SMTC window of the asynchronous SSB (i.e., the first SMTC window) is the same as the SMTC window corresponding to the first frequency information (i.e., the reference SMTC window), for example, the period and the window duration are the same. The difference between the two SMTC windows is that there is an offset in the time domain, the offset is indicated by the first offset information. Therefore, after obtaining the reference SMTC configuration corresponding to the first frequency information, the reference SMTC window corresponding to the reference SMTC configuration is moved forward/rearward by the time length indicated by the first offset information, to obtain the SMTC window of the asynchronous SSB.

II) The reference SMTC configuration is used for determining the reference SMTC window, and the first SMTC configuration is used for determining the first SMTC window. The time deviation between the first SMTC window and the reference SMTC window is determined based on the first offset information. Specifically, the reference SMTC configuration includes at least reference offset information used for determining the reference SMTC window; the terminal replaces the reference offset information in the reference SMTC configuration with the first offset information to obtain the first SMTC configuration; alternatively, the terminal generates second offset information according to the reference offset information and the first offset information, and replaces the reference offset information in the reference SMTC configuration with the second offset information to obtain the first SMTC configuration.

For this manner, based on the obtained SMTC configuration (i.e., the reference SMTC configuration), offset information in the reference SMTC configuration (i.e., the reference offset information) may be replaced with the first offset information to obtain the SMTC configuration of the asynchronous SSB; alternatively, the first offset information is added with (or subtracted with) the offset information in the reference SMTC configuration (i.e., the reference offset information) to obtain another offset information (i.e., the second offset information), and then the offset information in the reference SMTC configuration (i.e., the reference offset information) is replaced with the obtained second offset information to obtain the SMTC configuration of the asynchronous SSB.

In the above solution, the time length indicated by the offset information includes at least one of: N1 subframes, N2 slots or N3 symbols, where N1, N2 and N3 are positive integers.

In an embodiment of the disclosure, in consideration of the terminal reselects the cell, the following two ways may be used for determining the SMTC configuration:

(1) when the terminal reselects from the first cell to a second cell, the terminal determines the reference SMTC configuration corresponding to the first frequency information from the second configuration information of the second cell; and the terminal determines the second SMTC configuration according to the first offset information and the reference SMTC configuration, and takes the second SMTC configuration as the SMTC configuration used for performing measurement at the frequency layer where the asynchronous SSB is located. Further, the timing information of the second SMTC configuration is determined based on timing information of the second cell. Further, when the terminal fails to search for the second SMTC configuration corresponding to the first frequency information from the second configuration information of the second cell, the terminal determines the SSB period corresponding to the first frequency layer based on the default configuration.

(2) when the terminal reselects from the first cell to the second cell, the terminal determines the second SMTC configuration according to the timing deviation between the first cell and the second cell and the first SMTC configuration, and takes the second SMTC configuration as the SMTC configuration used for performing measurement at the frequency layer where the asynchronous SSB is located. Further, the timing information of the second SMTC configuration is determined based on the timing information of the second cell.

Specifically, the first SMTC configuration is used for determining the first SMTC window, and the second SMTC configuration is used for determining the second SMTC window. The time deviation between the first SMTC window and the second SMTC window is determined based on the timing deviation between the first cell and the second cell.

In a specific implementation, when the timing information of the second cell is earlier than the timing information of the first cell, the terminal moves the first SMTC window in an increase direction of time by the timing deviation to obtain the second SMTC window; or when the timing information of the second cell is later than the timing information of the first cell, the terminal moves the first SMTC window in a decrease direction of time by a timing deviation to obtain the second SMTC window.

It should be noted that the timing information of the second SMTC window is determined based on the timing information of the reselected cell (i.e., the second cell).

In the above solution, the timing deviation includes at least one of: M1 system frames, M2 subframes, M3 slots or M4 symbols, where M1, M2, M3 and M4 are positive integers.

The measurement frequency list configuration also includes the measurement configuration of at least one second frequency layer, the second frequency layer has a correspondence with the synchronous SSB.

For example, the NR measurement frequency list configuration includes the measurement configuration of at least one second frequency layer, and the second frequency layer corresponds to the synchronous SSB.

In this embodiment, the terminal determines the third SMTC configuration corresponding to the frequency information of the synchronous SSB from the second configuration information of the first cell, and takes the third SMTC configuration as an SMTC configuration used for performing measurement at a frequency layer where the synchronous SSB is located. Further and alternatively, timing information of the third SMTC configuration is determined based on the timing information of the first cell. Further and alternatively, when the terminal fails to search for the third SMTC configuration corresponding to the frequency information of the synchronous SSB from the second configuration information of the first cell, the terminal determines an SSB period corresponding to the second frequency layer based on the default configuration. For example, the default configuration may be used for determining the SSB period as 5 ms, 10 ms, etc.

For example, the terminal searches for frequency information corresponding to the synchronous SSB in SIB4 of the present serving cell, obtains the SMTC configuration corresponding to the frequency information, and takes the SMTC configuration as the SMTC configuration used for performing measurement at the frequency layer where the synchronous SSB is located. Moreover, the timing information of the SMTC configuration is determined based on the timing information of the present serving cell. When the terminal fails to search for the frequency information corresponding to the synchronous SSB in the SIB4, it is determined that the terminal is not configured with SMTC configuration, in this case, the terminal assumes that the SSB period of the frequency layer where the synchronous SSB is located is a default value, such as 5 ms.

In an optional implementation of the disclosure, the second configuration information is carried in the system broadcast message, and the second configuration information is used for determining a correspondence between at least one group of frequency information and the SMTC configuration.

It should be noted that the above solutions respectively describes the following two cases: the measurement frequency list configuration includes the measurement configuration of at least one first frequency layer; and the measurement frequency list configuration includes the measurement configuration of at least one second frequency layer. The case that the measurement frequency list configuration includes the measurement configuration of at least one first frequency layer and the measurement configuration of at least one second frequency layer is also applied to the above solutions of the embodiments of the disclosure.

In an optional implementation of the present application, taking into consideration the fact that the terminal reselects the cell, if the first configuration information is configured in the system broadcast message of the reselected target cell (hereinafter called as the second cell), the terminal needs to update the first configuration information, specifically, the terminal may update the first configuration information in the following ways.

(A) When the terminal reselects from the first cell to the second cell, the terminal obtains the first configuration information from the second cell; the terminal deletes the first configuration information already stored and stores the first configuration information obtained from the second cell.

(B) When the terminal reselects from the first cell to the second cell, the terminal obtains the first configuration information from the second cell; the terminal replaces a first portion of old first configuration information with a first portion of new first configuration information; and/or adds a second portion of the new first configuration information into the old first configuration information.

The new first configuration information is the first configuration information obtained from the second cell, the old first configuration information is the first configuration information already stored in the terminal. A frequency layer corresponding to the first portion has a measurement configuration in each of the new first configuration information and the old first configuration information, and a frequency layer corresponding to the second portion has a measurement configuration in the new first configuration information but has no measurement configuration in the old first configuration information.

According to the above technical solution, the SMTC configuration used for performing measurement at the frequency layer where the asynchronous SSB is located is determined, such that the terminal can obtain the SMTC configuration efficiently. On the other hand, timing information of the SMTC configuration is always determined with reference to timing information of a present serving cell, and a time domain location of a SMTC window determined by the SMTC configuration is adjusted, such that the measurement may be performed efficiently.

Figure 9:
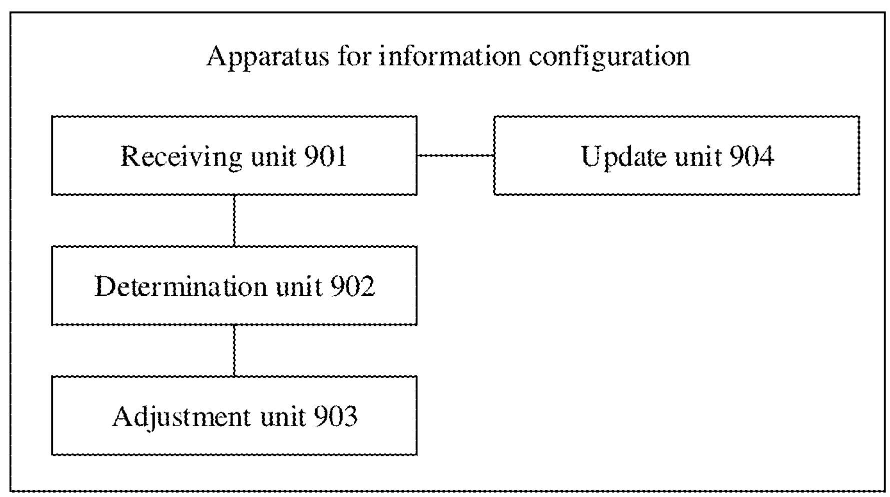
FIG. 9 is a composition structure schematic of an apparatus for information configuration according to an embodiment of the disclosure.

FIG. 9 is a composition structure schematic of an apparatus for information configuration according to an embodiment of the disclosure. As illustrated in FIG. 9, the apparatus for information configuration includes a receiving unit 901.

The receiving unit 901 is configured to receive first configuration information. The first configuration information is used for determining a measurement frequency list configuration, the measurement frequency list configuration includes measurement configuration of at least one first frequency layer corresponding to an asynchronous SSB. And the measurement configuration of the first frequency layer carries first indication information, the first indication information is used by a terminal to determine an SMTC configuration used for performing measurement at a frequency layer where the asynchronous SSB is located.

In an implementation, the first indication information indicates first frequency information, and the apparatus further includes a determination unit 902.

The determination unit 902 is configured to determine a first SMTC configuration corresponding to the first frequency information from second configuration information of a first cell, and take the first SMTC configuration as the SMTC configuration used for performing measurement at the frequency layer where the asynchronous SSB is located.

In an implementation, the first indication information indicates the first frequency information and first offset information, and the apparatus further includes a determination unit 902.

The determination unit 902 is configured to determine a reference SMTC configuration corresponding to the first frequency information from second configuration information of a first cell, determine a first SMTC configuration according to the first offset information and the reference SMTC configuration, and take the first SMTC configuration as the SMTC configuration used for performing measurement at the frequency layer where the asynchronous SSB is located.

In an implementation, the reference SMTC configuration is used for determining a reference SMTC window, and the first SMTC configuration is used for determining a first SMTC window.

A time deviation between the first SMTC window and the reference SMTC window is determined based on the first offset information.

In a possible implementation, the apparatus may further include an adjustment unit 903.

The adjustment unit 903 is configured to move the reference SMTC window in an increase direction of time by a time length corresponding to the first offset information to obtain the first SMTC window; or move the reference SMTC window in a decrease direction of time by a time length corresponding to the first offset information to obtain the first SMTC window.

In a possible implementation, the reference SMTC configuration includes at least reference offset information used for determining a reference SMTC window, and the apparatus further includes an adjustment unit 903.

The adjustment unit 903 is configured to replace the reference offset information in the reference SMTC configuration with the first offset information to obtain the first SMTC configuration. Alternatively, the adjustment unit 903 is configured to generate second offset information according to the reference offset information and the first offset information, and replace the reference offset information in the reference SMTC configuration with the second offset information to obtain the first SMTC configuration.

In an implementation, timing information of the first SMTC configuration is determined based on the timing information of the first cell.

In an implementation, the determination unit 902 is further configured to: when it fails to search for the first SMTC configuration corresponding to the first frequency information from the second configuration information of the first cell, determine an SSB period corresponding to the first frequency layer based on a default configuration.

In an implementation, the determination unit 902 is further configured to: when the terminal reselects from the first cell to a second cell, determine a second SMTC configuration corresponding to the first frequency information from second configuration information of the second cell, and take the second SMTC configuration as the SMTC configuration used for performing measurement at the frequency layer where the asynchronous SSB is located.

In an implementation, the determination unit 902 is configured to: when the terminal reselects from the first cell to a second cell, determine the reference SMTC configuration corresponding to the first frequency information from second configuration information of the second cell; determine a second SMTC configuration according to the first offset information and the reference SMTC configuration, and take the second SMTC configuration as the SMTC configuration used for performing measurement at the frequency layer where the asynchronous SSB is located.

In an implementation, timing information of the second SMTC configuration is determined based on the timing information of the second cell.

In an implementation, the determination unit 902 is further configured to: when it fails to search for the second SMTC configuration corresponding to the first frequency information from the second configuration information of the second cell, determine an SSB period corresponding to the first frequency layer based on a default configuration.

In an implementation, the determination unit 902 is further configured to: when the terminal reselects from the first cell to the second cell, determine a second SMTC configuration according to a timing deviation between the first cell and the second cell and the first SMTC configuration, and take the second SMTC configuration as the SMTC configuration used for performing measurement at the frequency layer where the asynchronous SSB is located.

In an implementation, timing information of the second SMTC configuration is determined based on the timing information of the second cell.

In an implementation, the first SMTC configuration is used for determining a first SMTC window, and the second SMTC configuration is used for determining a second SMTC window.

A time deviation between the first SMTC window and the second SMTC window is determined based on the timing deviation between the first cell and the second cell.

In a possible implementation, the apparatus may further include an adjustment unit 903.

The adjustment unit 903 is configured to: when the timing information of the second cell is earlier than the timing information of the first cell, move the first SMTC window in an increase direction of time by the timing deviation to obtain the second SMTC window; or when the timing information of the second cell is later than the timing information of the first cell, move the first SMTC window in a decrease direction of time by a timing deviation to obtain the second SMTC window.

In an implementation, the measurement frequency list configuration also includes the measurement configuration of at least one second frequency layer, the second frequency layer has a correspondence with the synchronous SSB. The apparatus further includes a determination unit 902.

The determination unit 902 is configured to: determine a third SMTC configuration corresponding to frequency information of the synchronous SSB from the second configuration information of the first cell, and take the third SMTC configuration as an SMTC configuration used for performing measurement at a frequency layer where the synchronous SSB is located.

In an implementation, timing information of the third SMTC configuration is determined based on the timing information of the first cell.

In an implementation, the determination unit 902 is further configured to: when it fails to search for the third SMTC configuration corresponding to the synchronous SSB from the second configuration information of the first cell, determine an SSB period corresponding to the second frequency layer based on a default configuration.

In an implementation, the second configuration information is carried in the system broadcast message, and the second configuration information is used for determining a correspondence between at least one group of frequency information and the SMTC configuration.

In an implementation, the first configuration information is carried in a system broadcast message or RRC dedicated signaling.

In an implementation, the measurement frequency list configuration includes at least an NR measurement frequency list configuration.

In an implementation, the first configuration information is used for measurement of the terminal in a connected state and/or an inactive state, and a measurement result corresponding to the first configuration information is used for the network to configure a carrier aggregation and/or a dual connection.

In a possible implementation, the apparatus may further include an update unit 904.

The update unit 904 is configured to: when the terminal reselects from a first cell to a second cell, obtain first configuration information from the second cell; delete the first configuration information already stored; and store the first configuration information obtained from the second cell.

In a possible implementation, the apparatus may further include an update unit 904.

The update unit 904 is configured to: when the terminal reselects from a first cell to a second cell, obtain first configuration information from the second cell, and perform at least one of: replacing a first portion of old first configuration information with a first portion of new first configuration information; or adding a second portion of the new first configuration information into the old first configuration information.

The new first configuration information is the first configuration information obtained from the second cell, and the old first configuration information is the first configuration information already stored in the terminal. A frequency layer corresponding to the first portion has a measurement configuration in each of the new first configuration information and the old first configuration information, and a frequency layer corresponding to the second portion has a measurement configuration in the new first configuration information but has no measurement configuration in the old first configuration information.

Figure 10:
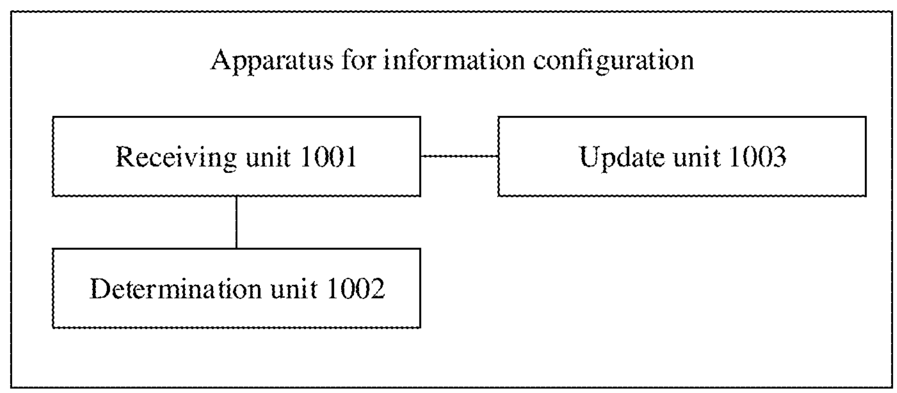
FIG. 10 is another composition schematic of an apparatus for information configuration according to an embodiment of the disclosure.

It should be understood by a person of ordinary skill in the art that the relevant description of the above apparatus for information configuration in the embodiments of the disclosure may be understood with reference to relevant description of the method for information configuration in the embodiments of the disclosure FIG. 10 is another composition structure schematic of an apparatus for information configuration according to an embodiment of the disclosure. As illustrated in FIG. 10, the apparatus for information configuration includes a receiving unit 1001 and a determination unit 1002.

The receiving unit 1001 is configured to receive first configuration information. The first configuration information is used for determining a measurement frequency list configuration, the measurement frequency list configuration includes measurement configuration of at least one second frequency layer having a correspondence with a synchronous SSB.

The determination unit 1002 is configured to: determine a third SMTC configuration corresponding to frequency information of the synchronous SSB from the second configuration information of the first cell, and take the third SMTC configuration as an SMTC configuration used for performing measurement at a frequency layer where the synchronous SSB is located.

In an implementation, timing information of the third SMTC configuration is determined based on the timing information of the first cell.

In an implementation, the determination unit 1002 is further configured to: when it fails to search for the third SMTC configuration corresponding to the synchronous SSB from the second configuration information of the first cell, determine an SSB period corresponding to the second frequency layer based on a default configuration.

In an implementation, the second configuration information is carried in the system broadcast message, and the second configuration information is used for determining a correspondence between at least one group of frequency information and the SMTC configuration.

In an implementation, the first configuration information is carried in a system broadcast message or RRC dedicated signaling.

In an implementation, the measurement frequency list configuration includes at least an NR measurement frequency list configuration.

In an implementation, the first configuration information is used for measurement of the terminal in a connected state and/or an inactive state, and a measurement result corresponding to the first configuration information is used for the network to configure a carrier aggregation and/or a dual connection.

In a possible implementation, the apparatus may further include an update unit 1003.

The update unit 1003 is configured to: when the terminal reselects from a first cell to a second cell, obtain first configuration information from the second cell; delete the first configuration information already stored; and store the first configuration information obtained from the second cell.

In a possible implementation, the apparatus may further include an update unit 1003.

The update unit 1003 is configured to: when the terminal reselects from a first cell to a second cell, obtain first configuration information from the second cell, and perform at least one of: replacing a first portion of old first configuration information with a first portion of new first configuration information; or adding a second portion of the new first configuration information into the old first configuration information.

The new first configuration information is the first configuration information obtained from the second cell, and the old first configuration information is the first configuration information already stored in the terminal. A frequency layer corresponding to the first portion has a measurement configuration in each of the new first configuration information and the old first configuration information, and a frequency layer corresponding to the second portion has a measurement configuration in the new first configuration information but has no measurement configuration in the old first configuration information.

Figure 11:
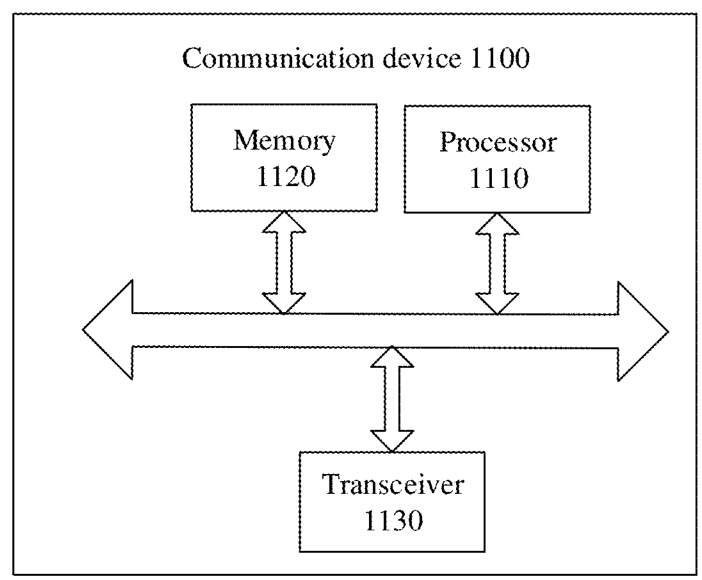
FIG. 11 is a schematic structural diagram of a communication device according to an embodiment of the disclosure.

It should be understood by a person of ordinary skill in the art that the relevant description of the above apparatus for information configuration in the embodiments of the disclosure may be understood with reference to relevant description of the method for information configuration in the embodiments of the disclosure FIG. 11 is a schematic structural diagram of a communication device 1100 according to an embodiment of the disclosure. The communication device may be a terminal, or may be a network device. The communication device 1100 illustrated in FIG. 11 includes a processor 1110. The processor 1110 may be configured to call and run a computer program stored in a memory to perform the method according to the embodiments of the disclosure.

Optionally, as illustrated in FIG. 11, the communication device 1100 may further include a memory 1120. The processor 1110 may be configured to call and execute the computer program stored in the memory 1120 to perform the method according to an embodiment of the disclosure.

The memory 1120 may be a separate device independent from the processor 1110, or may be integrated in the processor 1110.

Optionally, as illustrated in FIG. 11, the communication device 1100 may further include a transceiver 1130. The processor 1110 may control the transceiver 1130 to communicate with other devices, specifically, to transmit information or data to other devices, or receive information or data from other devices.

The transceiver 1130 may include a transmitter and a receiver. The transceiver 1130 may further include an antenna, the number of the antenna may be one or more.

Optionally, the communication device 1100 may specifically be a network device in embodiments of the disclosure. The communication device 1100 may implement corresponding processes that are implemented by the network device in various methods of the embodiments of the disclosure. For brevity, details are not described herein again.

Optionally, the communication device 1100 may specifically be a mobile terminal/terminal in embodiments of the disclosure. The communication device 1100 may implement corresponding processes that are implemented by the mobile terminal/terminal in various methods of the embodiments of the disclosure. For brevity, details are not described herein again.

Figure 12:
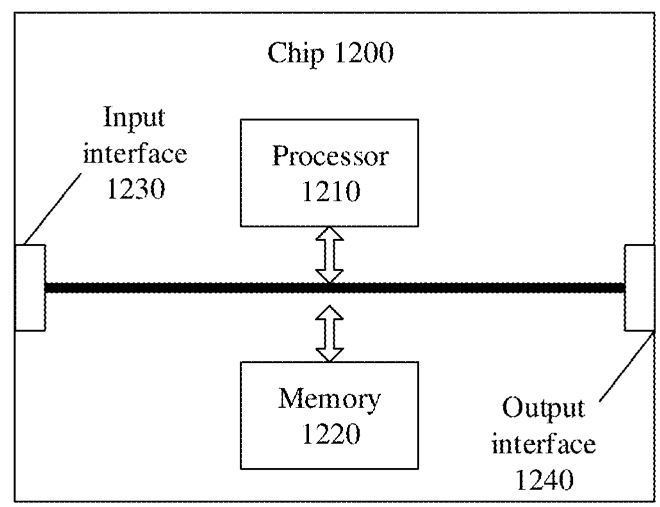
FIG. 12 is a schematic structural diagram of a chip according to an embodiment of the disclosure.

FIG. 12 is a schematic structural diagram of a chip according to an embodiment of the disclosure. The chip 1200 illustrated in FIG. 12 includes a processor 1210. The processor 1210 may be configured to call and execute a computer program stored in a memory to perform the method according to an embodiment of the disclosure.

Optionally, as illustrated in FIG. 12, the chip 1200 may further include a memory 1220. The processor 1210 may be configured to call and execute the computer program stored in the memory 1220 to perform the method according to an embodiment of the disclosure.

The memory 1220 may be a separate device independent from the processor 1210, or may be integrated in the processor 1210.

Optionally, the chip 1200 may further include an input interface 1230. The processor 1210 may control the input interface 1230 to communicate with other devices or chips, specifically, to obtain information or data from other devices or chips.

Optionally, the chip 1200 may further include an output interface 1240. The processor 1210 may control the output interface 1240 to communicate with other devices or chips, specifically, to output information or data to other devices or chips.

Optionally, the chip may be applied to a network device in embodiments of the disclosure. The chip may implement corresponding processes that are implemented by the network device in various methods of the embodiments of the disclosure. For brevity, details are not described herein again.

Optionally, the chip may be applied to a mobile terminal/terminal in embodiments of the disclosure. The chip may implement corresponding processes that are implemented by the mobile terminal/terminal in various methods of the embodiments of the disclosure. For brevity, details are not described herein again.

It should be understood that, the chip mentioned in the embodiments of the disclosure may be also referred to a system-level chip, a system chip, a chip system or a chip of a system on chip, etc.

Figure 13:
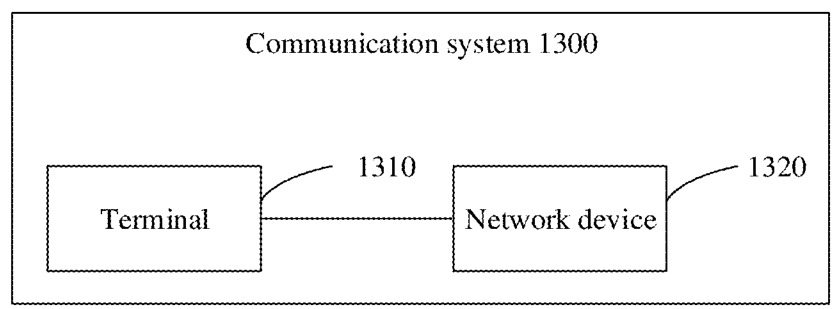
FIG. 13 is a schematic block diagram of a communication system according to an embodiment of the disclosure.

FIG. 13 is a schematic block diagram of a communication system 1300 according to an embodiment of the disclosure. As illustrated in FIG. 13, the communication system 1300 includes a terminal 1310 and a network device 1320.

The terminal 1310 may be configured to implement corresponding functions that are implemented by the terminal of the above method. And the network device 1320 may be configured to implement corresponding functions that are implemented by the network device of the above method. For brevity, details are not described herein again.

It should be understood that, the processor of the embodiments of the disclosure may be an integrated circuit chip, and has a signal processing capability. During implementation, the steps of the foregoing method embodiments may be implemented by using a hardware integrated logic circuit in the processor or implemented by using instructions in a software form. The foregoing processor may be a general purpose processor, a digital signal processor (DSP), an application-specific integrated circuit (ASIC), a field programmable gate array (FPGA), or another programmable logical device, discrete gate or transistor logical device, or discrete hardware component. The processor may implement or perform methods, steps and logical block diagrams disclosed in the embodiments of the disclosure. The general purpose processor may be a microprocessor or the processor may be any conventional processor and the like. Steps of the methods disclosed with reference to the embodiments of the disclosure may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It can be understood that, the memory in the embodiments of the disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), and is used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct rambus random access memory (DR RAM). It should be noted that, the memory for the system and the method described herein aims to include but not limited to these memories and any other suitable types of memories.

It should be understood that, the foregoing memory is exemplary but not limitative description, for example, the memory in the embodiments of the disclosure may be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synch link dynamic random access memory (SLDRAM) and a direct rambus random access memory (DR RAM), etc. It should be noted that, the memory in the embodiments of the present disclosure aims to include but not limited to these memories and any other suitable types of memories.

An embodiment of the disclosure further provides a computer-readable storage medium, configured to store a computer program.

Optionally, the computer-readable storage medium may be applied to a network device in embodiments of the disclosure, and the computer program causes a computer to implement corresponding processes that are implemented by the network device in various methods of the embodiments of the disclosure. For brevity, details are not described herein again.

Optionally, the computer-readable storage medium may be applied to a mobile terminal/terminal in embodiments of the disclosure, and the computer program causes a computer to implement corresponding processes that are implemented by the mobile terminal/terminal in various methods of the embodiments of the disclosure. For brevity, details are not described herein again.

An embodiment of the disclosure further provides a computer program product including a computer program.

Optionally, the computer program product may be applied to a network device in embodiments of the disclosure, and the computer program instructions cause a computer to implement corresponding processes that are implemented by the network device in various methods of the embodiments of the disclosure. For brevity, details are not described herein again.

Optionally, the computer program product may be applied to a mobile terminal/terminal in embodiments of the disclosure, and the computer program instructions cause a computer to implement corresponding processes that are implemented by the mobile terminal/terminal in various methods of the embodiments of the disclosure. For brevity, details are not described herein again.

An embodiment of the disclosure further provides a computer program.

Optionally, the computer program may be applied to a network device in embodiments of the disclosure, when the computer program is executed by a computer, it causes the computer to implement corresponding processes that are implemented by the network device in various methods of the embodiments of the disclosure. For brevity, details are not described herein again.

Optionally, the computer program may be applied to a mobile terminal/terminal in embodiments of the disclosure, when the computer program is executed by a computer, it causes the computer to implement corresponding processes that are implemented by the mobile terminal/terminal in various methods of the embodiments of the disclosure. For brevity, details are not described herein again.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other schemes. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional module and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps of the method described in the embodiment of the disclosure. The foregoing storage medium includes: any medium that can store program codes, such as a USB flash disk, a removable hard disk, a read-only memory (ROM), a random access memory (RAM), a magnetic disk, or an optical disk.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method for information configuration, comprising:

receiving, by a terminal, first configuration information through RRC release message, wherein the first configuration information is used for determining a measurement frequency list configuration, the measurement frequency list configuration comprises measurement configuration of at least one first frequency layer corresponding to a first synchronization signal block (SSB), and wherein the measurement configuration of the at least one first frequency layer carries indication information, the indication information is used by the terminal to determine a SSB measurement timing configuration (SMTC) configuration used for performing measurement at a frequency layer where the first SSB is located;

wherein the measurement frequency list configuration further comprises measurement configuration of at least one second frequency layer corresponding to a second SSB, and the method further comprises:

determining, by the terminal, a SMTC configuration corresponding to frequency information of the second SSB from second configuration information of a first cell, and taking the SMTC configuration corresponding to frequency information of the second SSB as an SMTC configuration used for performing measurement at a frequency layer where the second SSB is located; wherein the second configuration information is carried in a system broadcast message, and the second configuration information is used for determining a correspondence between at least one group of frequency information and an SMTC configuration;

wherein the SMTC configuration corresponding to the frequency layer where the first SSB is located is carried in the RRC release message, which is dedicated signaling.

2. The method of claim 1, further comprising:

when the terminal fails to find a third SMTC configuration corresponding to the frequency information of the second SSB from the second configuration information of the first cell, determining, by the terminal, an SSB period corresponding to the at least one second frequency layer based on a default configuration.

3. The method of claim 1, further comprising:

when the terminal reselects from a first cell to a second cell, obtaining, by the terminal, first configuration information from the second cell; deleting, by the terminal, the first configuration information already stored; and storing the first configuration information obtained from the second cell.

4. The method of claim 1, wherein timing information of a third SMTC configuration is determined based on timing information of the first cell.

5. The method of claim 1, wherein the measurement frequency list configuration comprises at least a new radio (NR) measurement frequency list configuration.

6. The method of claim 1, wherein the first configuration information is used for measurement of the terminal in at least one of a connected state or an inactive state, and a measurement result corresponding to the first configuration information is used for a network to configure at least one of a carrier aggregation or a dual connection.

7. A terminal, comprising:

a transceiver, configured to receive first configuration information through RRC release message, wherein the first configuration information is used for determining a measurement frequency list configuration, the measurement frequency list configuration comprises measurement configuration of at least one first frequency layer corresponding to a first synchronization signal (SSB), and wherein the measurement configuration of the at least one first frequency layer carries indication information, the indication information is used by the terminal to determine a SSB measurement timing configuration (SMTC) configuration used for performing measurement at a frequency layer where the first SSB is located;

wherein the measurement frequency list configuration further comprises measurement configuration of at least one second frequency layer corresponding to a second SSB, and the and the terminal further comprises:

a processor, configured to determine a SMTC configuration corresponding to frequency information of the second SSB from second configuration information of a first cell, and take the SMTC configuration corresponding to frequency information of the second SSB as an SMTC configuration used for performing measurement at a frequency layer where the second SSB is located; wherein the second configuration information is carried in a system broadcast message, and the second configuration information is used for determining a correspondence between at least one group of frequency information and an SMTC configuration;

wherein the SMTC configuration corresponding to the frequency layer where the first SSB is located is carried in the RRC release message, which is dedicated signaling.

8. The terminal of claim 7, wherein timing information of a third SMTC configuration is determined based on timing information of the first cell.

9. The terminal of claim 7, wherein the processor is further configured to: when it fails to find a third SMTC configuration corresponding to the frequency information of the second SSB from the second configuration information of the first cell, determine an SSB period corresponding to the at least one second frequency layer based on a default configuration.

10. The terminal of claim 7, wherein the measurement frequency list configuration comprises at least a new radio (NR) measurement frequency list configuration.

11. The terminal of claim 7, wherein the first configuration information is used for measurement of the terminal in at least one of a connected state or an inactive state, and a measurement result corresponding to the first configuration information is used for a network to configure at least one of a carrier aggregation or a dual connection.

12. The terminal of claim 7, further comprising:

a processor, configured to: when the terminal reselects from a first cell to a second cell, obtain first configuration information from the second cell; delete the first configuration information already stored; and store the first configuration information obtained from the second cell.

13. A non-transitory computer-readable storage medium having stored therein a computer program, which, when executed by a computer, causes the computer to perform operations comprising:

receiving first configuration information through RRC release message, wherein the first configuration information is used for determining a measurement frequency list configuration, the measurement frequency list configuration comprises measurement configuration of at least one first frequency layer corresponding to a first synchronization signal block (SSB), and wherein the measurement configuration of the at least one first frequency layer carries indication information, the indication information is used by a terminal to determine a SSB measurement timing configuration (SMTC) configuration used for performing measurement at a frequency layer where the first SSB is located;

wherein the measurement frequency list configuration further comprises measurement configuration of at least one second frequency layer corresponding to a second SSB, and the operations further comprise:

determining a SMTC configuration corresponding to frequency information of the second SSB from second configuration information of a first cell, and taking the SMTC configuration corresponding to frequency information of the second SSB as an SMTC configuration used for performing measurement at a frequency layer where the second SSB is located; wherein the second configuration information is carried in a system broadcast message, and the second configuration information is used for determining a correspondence between at least one group of frequency information and an SMTC configuration;

wherein the SMTC configuration corresponding to the frequency layer where the first SSB is located is carried in the RRC release message, which is dedicated signaling.

* * * * *